(12) United States Patent
Jung

(10) Patent No.: US 12,027,947 B2
(45) Date of Patent: Jul. 2, 2024

(54) MOTOR

(71) Applicant: LG INNOTEK CO., LTD., Seoul (KR)

(72) Inventor: Young Hwan Jung, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 531 days.

(21) Appl. No.: 17/286,559

(22) PCT Filed: Oct. 22, 2019

(86) PCT No.: PCT/KR2019/013851
§ 371 (c)(1),
(2) Date: Apr. 19, 2021

(87) PCT Pub. No.: WO2020/085744
PCT Pub. Date: Apr. 30, 2020

(65) Prior Publication Data
US 2021/0344251 A1 Nov. 4, 2021

(30) Foreign Application Priority Data

Oct. 22, 2018 (KR) .................. 10-2018-0126087
Jul. 3, 2019 (KR) .................. 10-2019-0080213

(51) Int. Cl.
*H02K 5/22* (2006.01)
*H02K 3/50* (2006.01)

(52) U.S. Cl.
CPC ............ *H02K 5/225* (2013.01); *H02K 3/505* (2013.01); *H02K 2203/09* (2013.01)

(58) Field of Classification Search
CPC ..... H02K 5/225; H01R 13/22; H01R 2201/10
USPC .......................................................... 310/71
See application file for complete search history.

(56) References Cited

U.S. PATENT DOCUMENTS 7,588,444 B2 * 9/2009 Kataoka ................ H02K 11/33
439/76.2
8,018,104 B2 * 9/2011 Yagai .................... H02K 3/522
310/71

(Continued)

FOREIGN PATENT DOCUMENTS

DE 10232281 2/2004
JP 2001-95201 4/2001

(Continued)

OTHER PUBLICATIONS

English machine translation, JP2008-220061 (Year: 2008).*

(Continued)

*Primary Examiner* — Burton S Mullins
(74) *Attorney, Agent, or Firm* — KED & ASSOCIATES, LLP

(57) ABSTRACT

The present invention may provide a motor including a housing, a stator disposed in the housing, a rotor disposed in the stator, a shaft coupled to the rotor, a busbar disposed above the stator, and a terminal portion connected to the busbar, wherein the busbar includes a busbar body and a plurality of first terminals disposed on the busbar body, the terminal portion includes a terminal body and second terminals disposed on the terminal body, first end portions of the first terminals are in contact with second end portions of the second terminals, the busbar body includes a first coupling part, the terminal body includes a second coupling part, the first coupling part is disposed between the first end portions, and the second coupling part is disposed between the second end portions.

4 Claims, 21 Drawing Sheets

(56) References Cited

U.S. PATENT DOCUMENTS

| | | | | |
|---|---|---|---|---|
| 8,816,550 B2 * | 8/2014 | Kim | ..................... | B62D 5/0403 |
| | | | | 310/43 |
| 9,819,240 B2 * | 11/2017 | Hashimoto | .............. | H02K 3/28 |
| 10,315,686 B2 * | 6/2019 | Wada | ..................... | H02K 11/33 |
| 10,763,723 B2 * | 9/2020 | Sambuichi | ............. | H02K 3/522 |
| 10,855,130 B2 * | 12/2020 | Kim | ....................... | H02K 5/225 |
| 2015/0311764 A1 | 10/2015 | Nakamura et al. | | |
| 2017/0104281 A1 | 4/2017 | Kurono et al. | | |
| 2018/0123414 A1 | 5/2018 | Kim | | |
| 2018/0241272 A1 * | 8/2018 | Asahi | ................ | H02K 15/0068 |

FOREIGN PATENT DOCUMENTS

| | | | | |
|---|---|---|---|---|
| JP | 2008-220061 | | 9/2008 | |
| JP | 2010-143473 | * | 7/2010 | .............. B62D 5/04 |
| JP | 2015-156754 | | 8/2015 | |
| JP | 2018-061424 | | 4/2018 | |
| KR | 20-2011-0008582 | | 9/2011 | |
| KR | 10-2016-0123143 | | 10/2016 | |
| KR | 10-2017-0083358 | | 7/2017 | |
| KR | 10-2017-0102744 | | 9/2017 | |

OTHER PUBLICATIONS

European Communication dated Jun. 29, 2022 issued in Application No. 19876706.3.
International Search Report dated Jan. 28, 2020 issued in Application No. PCT/KR2019/013851.
Chinese Office Action dated Apr. 19, 2023 issued in Application No. 201980069555.2.

* cited by examiner

[FIG. 1]
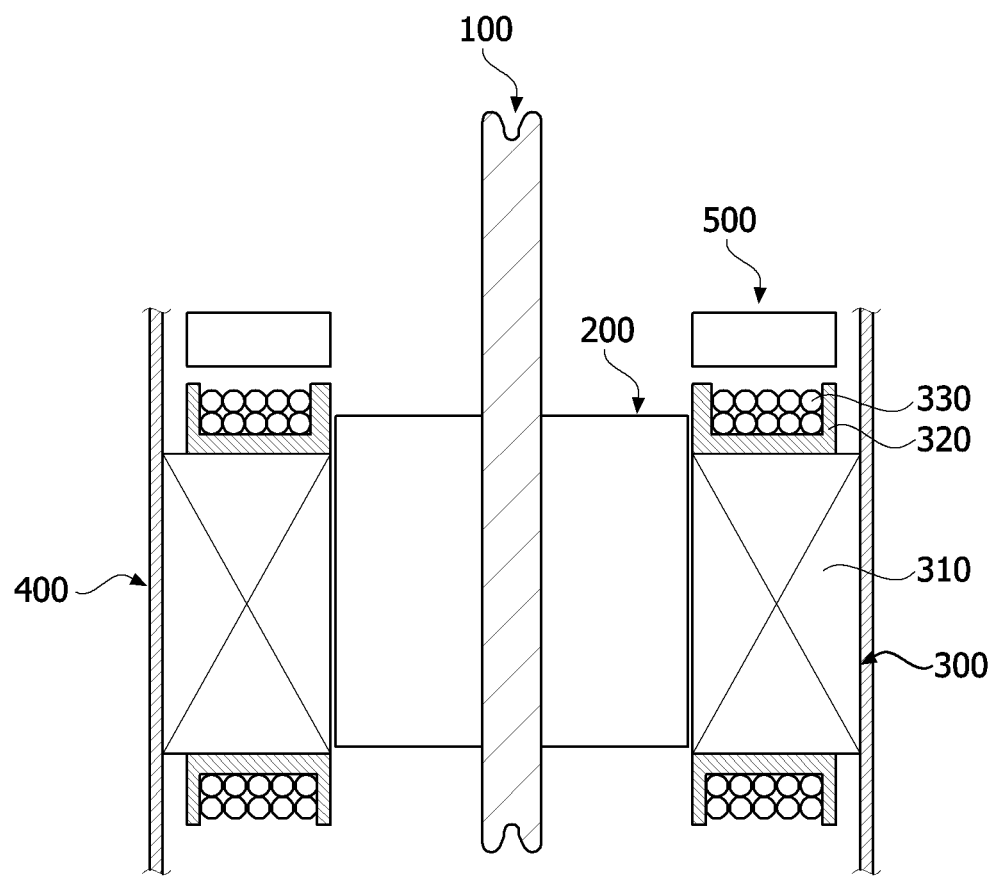

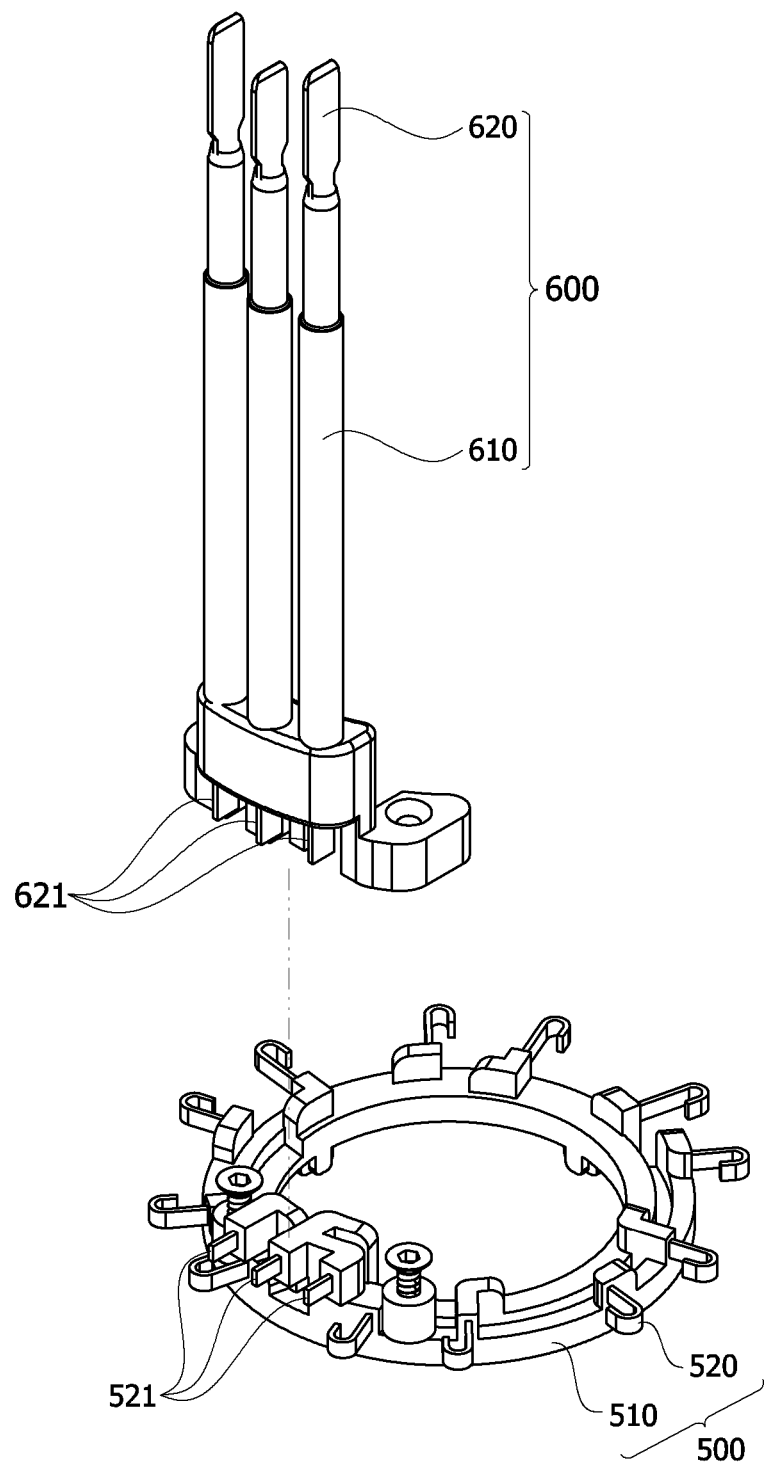
[FIG. 2]

[FIG. 3]
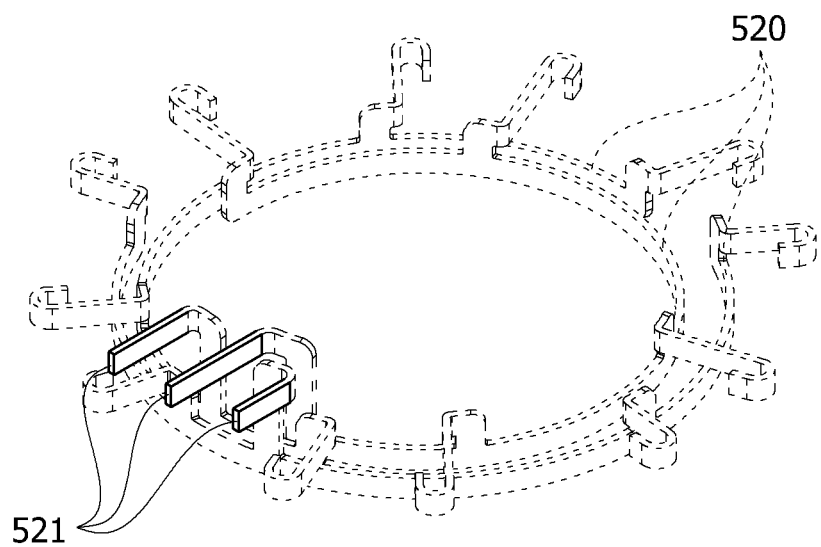

[FIG. 4]
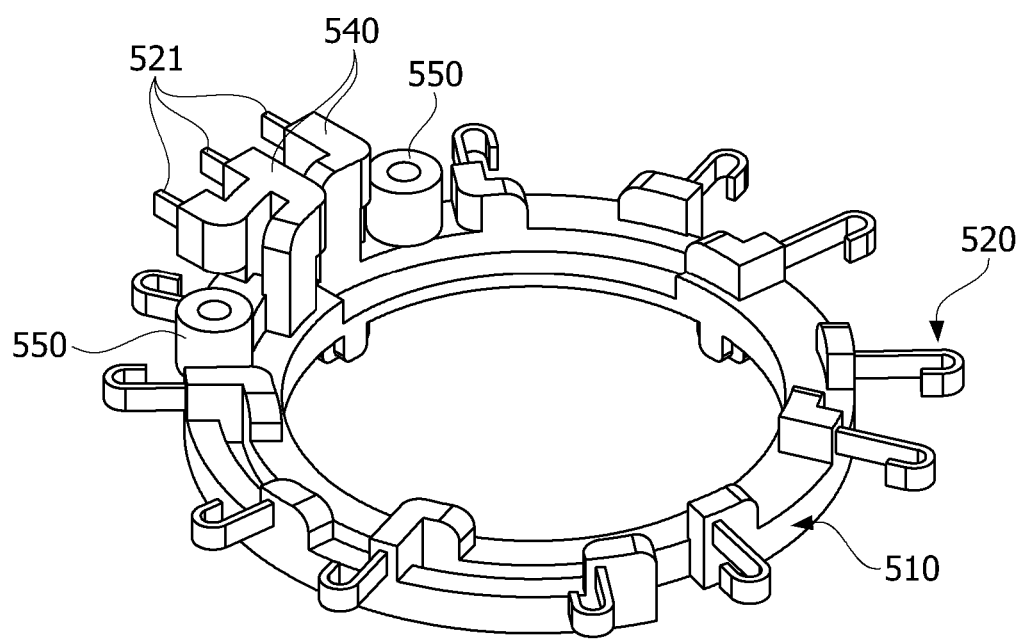

[FIG. 5]
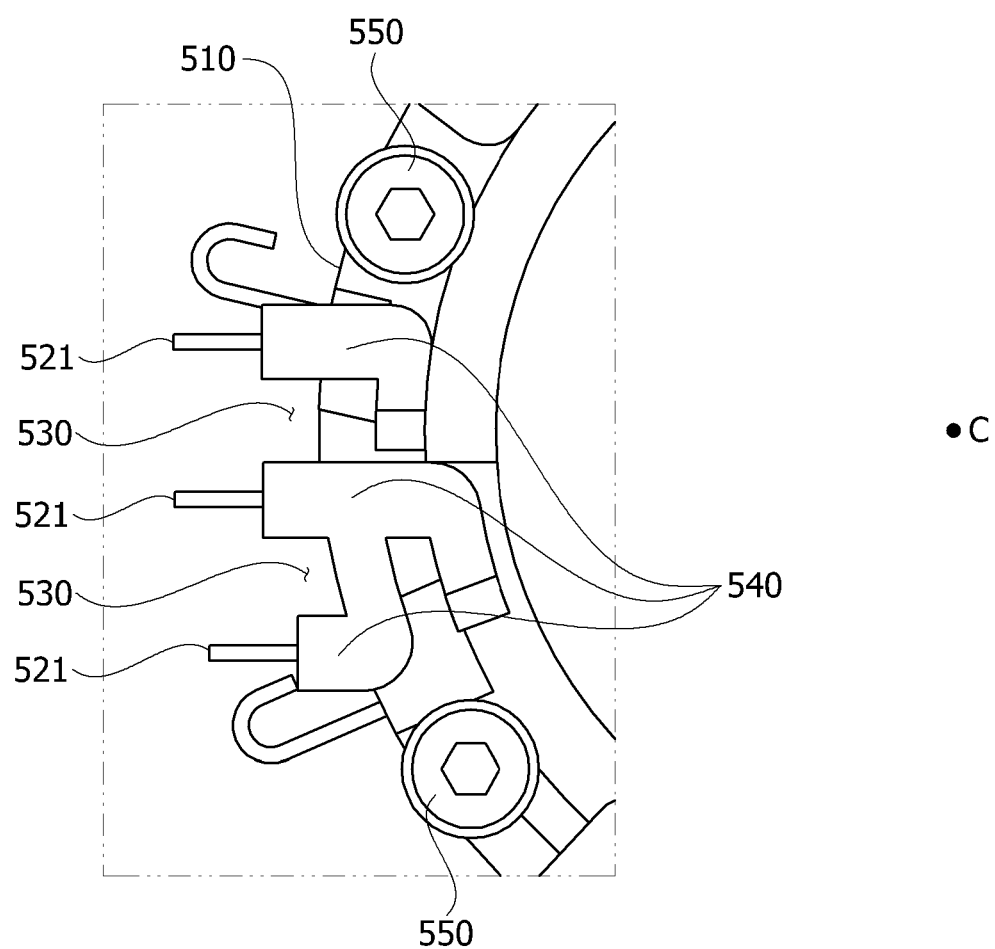

[FIG. 6]
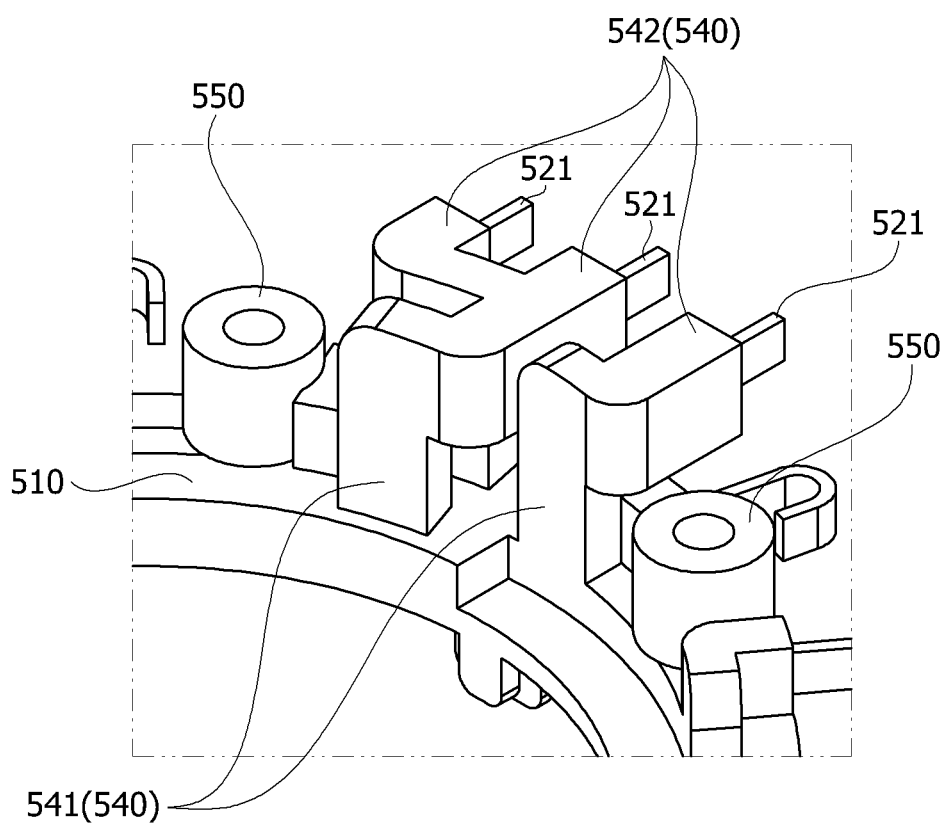

[FIG. 7]
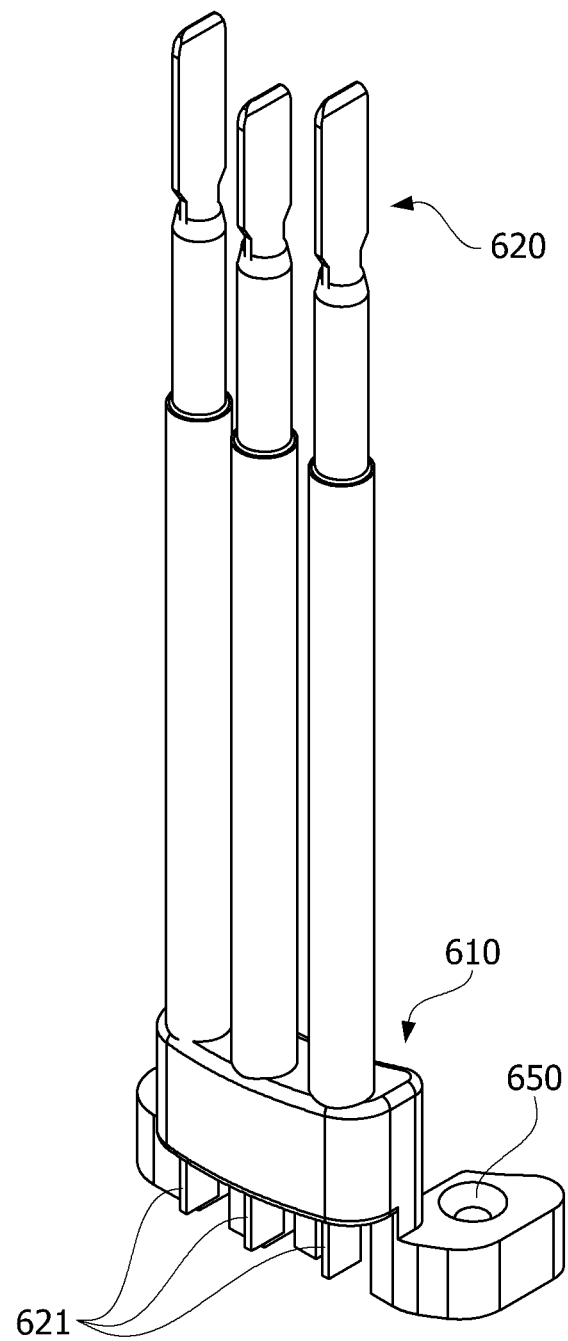

[FIG. 8]
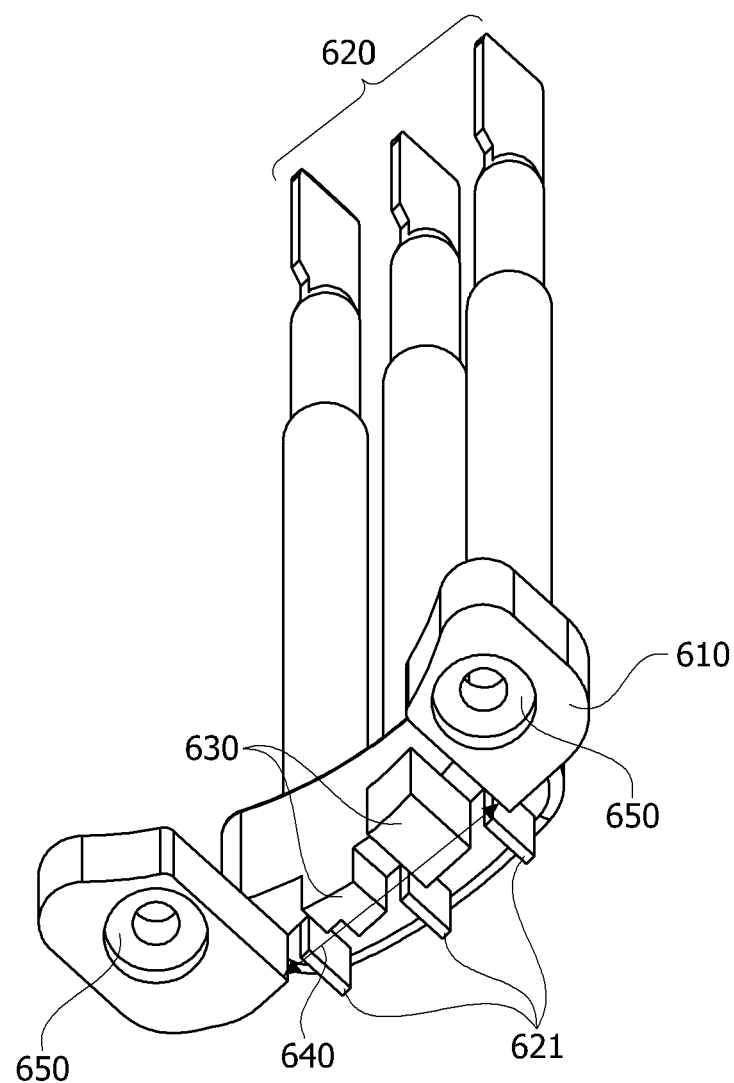

[FIG. 9]
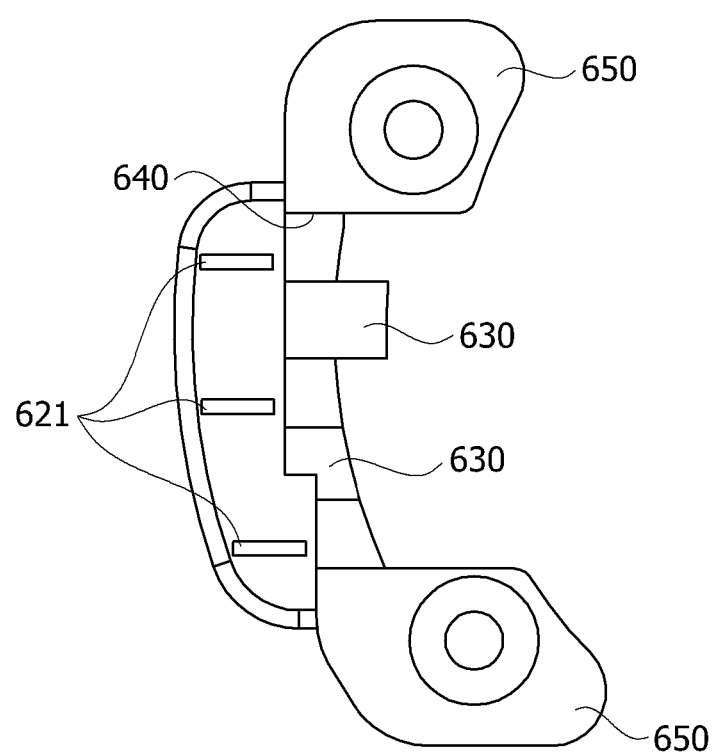

[FIG. 10]
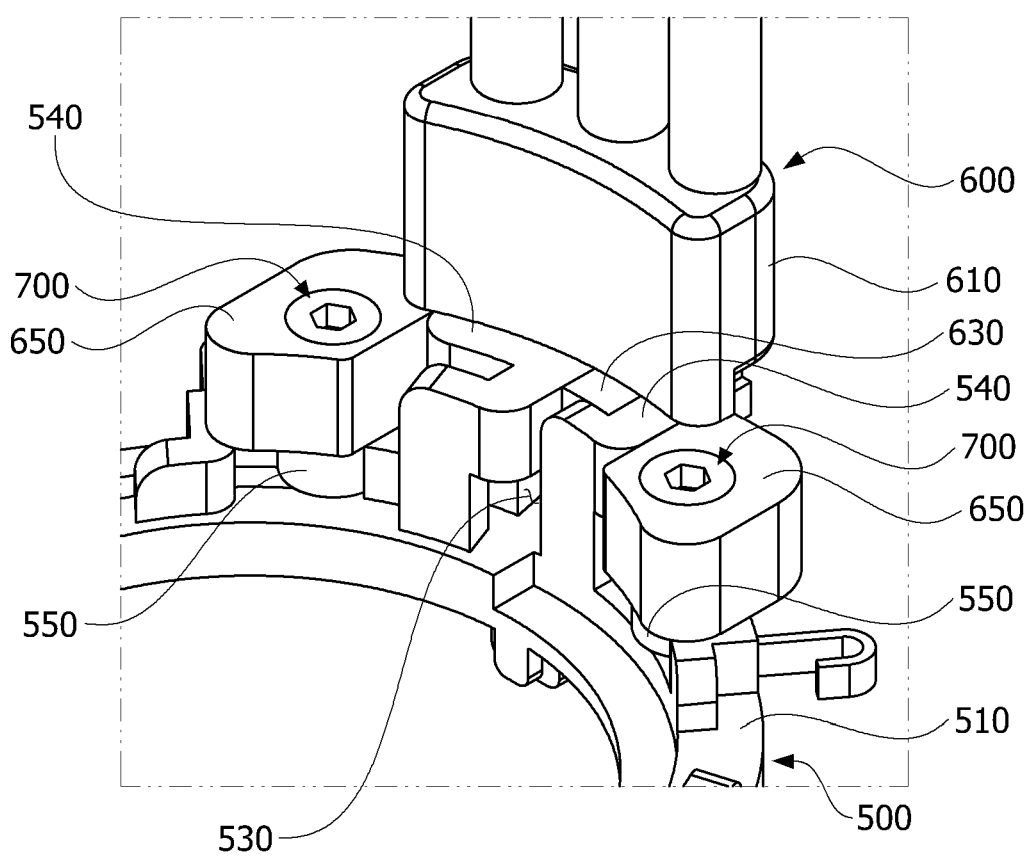

[FIG. 11]
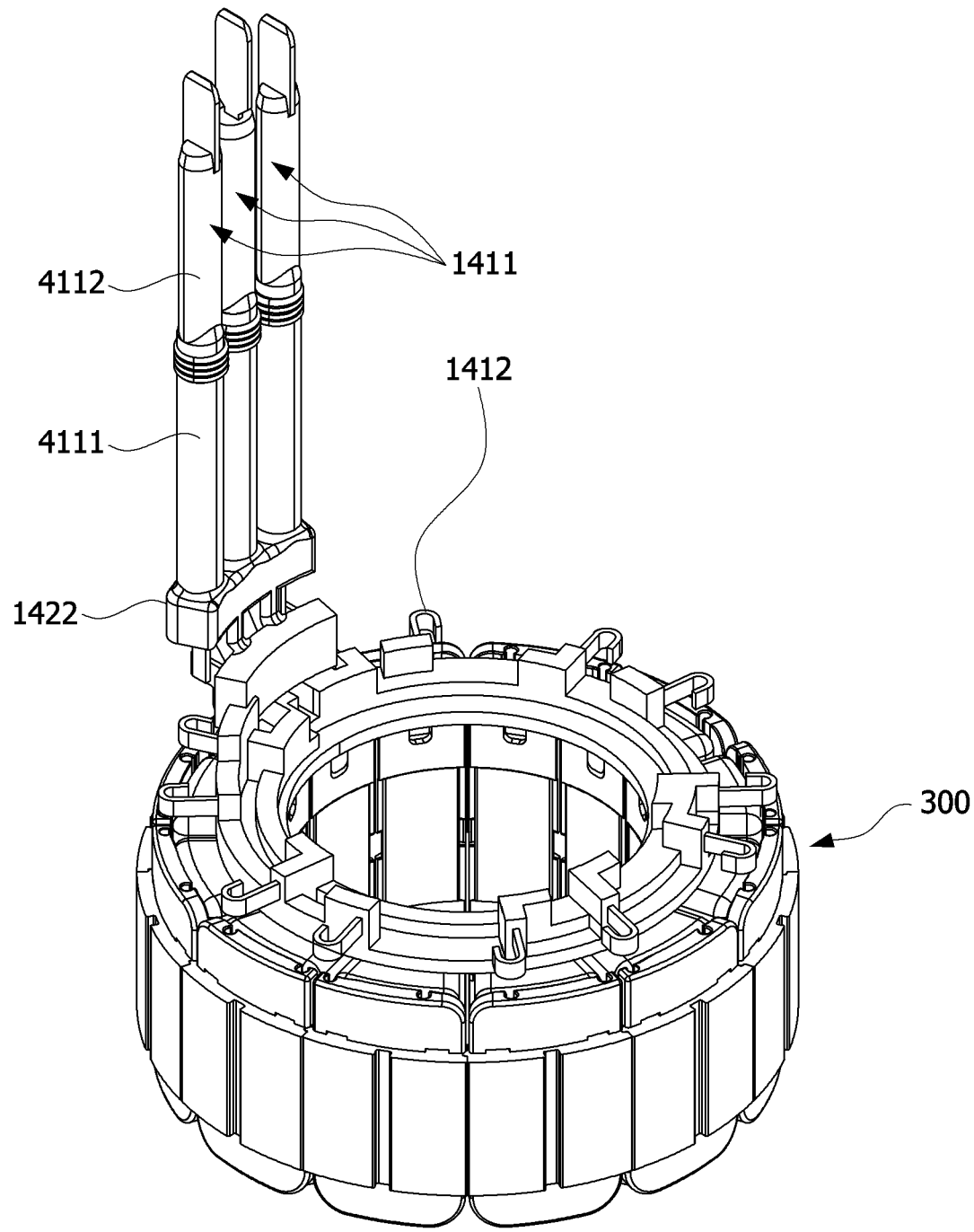

[FIG. 12]
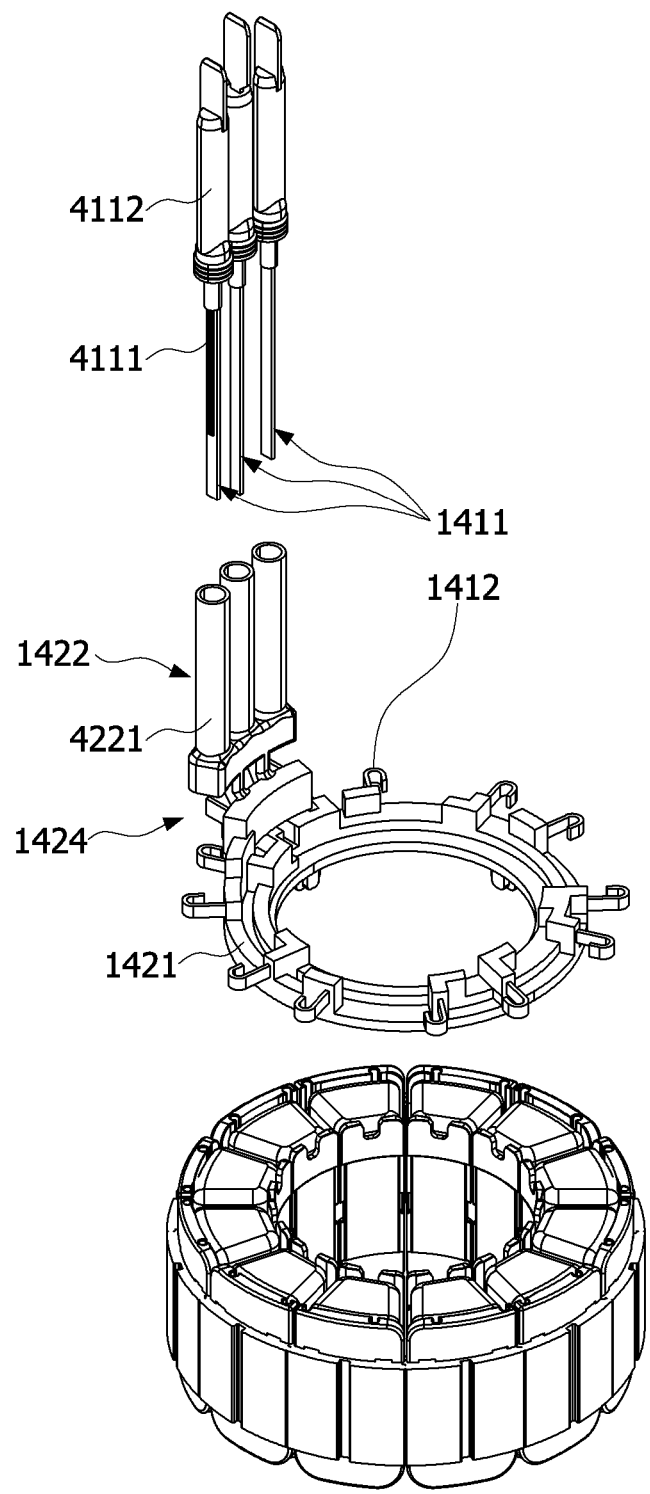

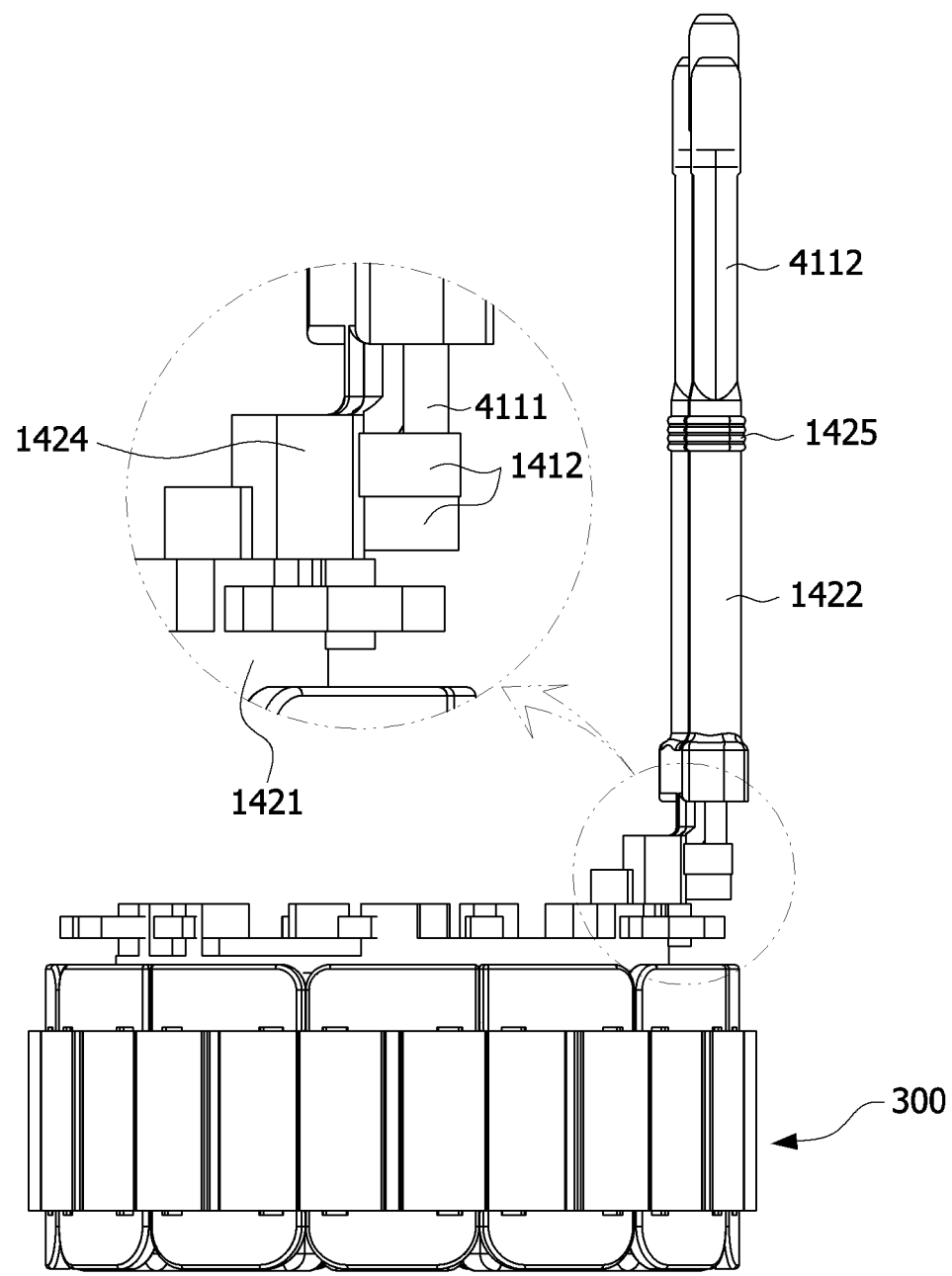
[FIG. 13]

[FIG. 14]
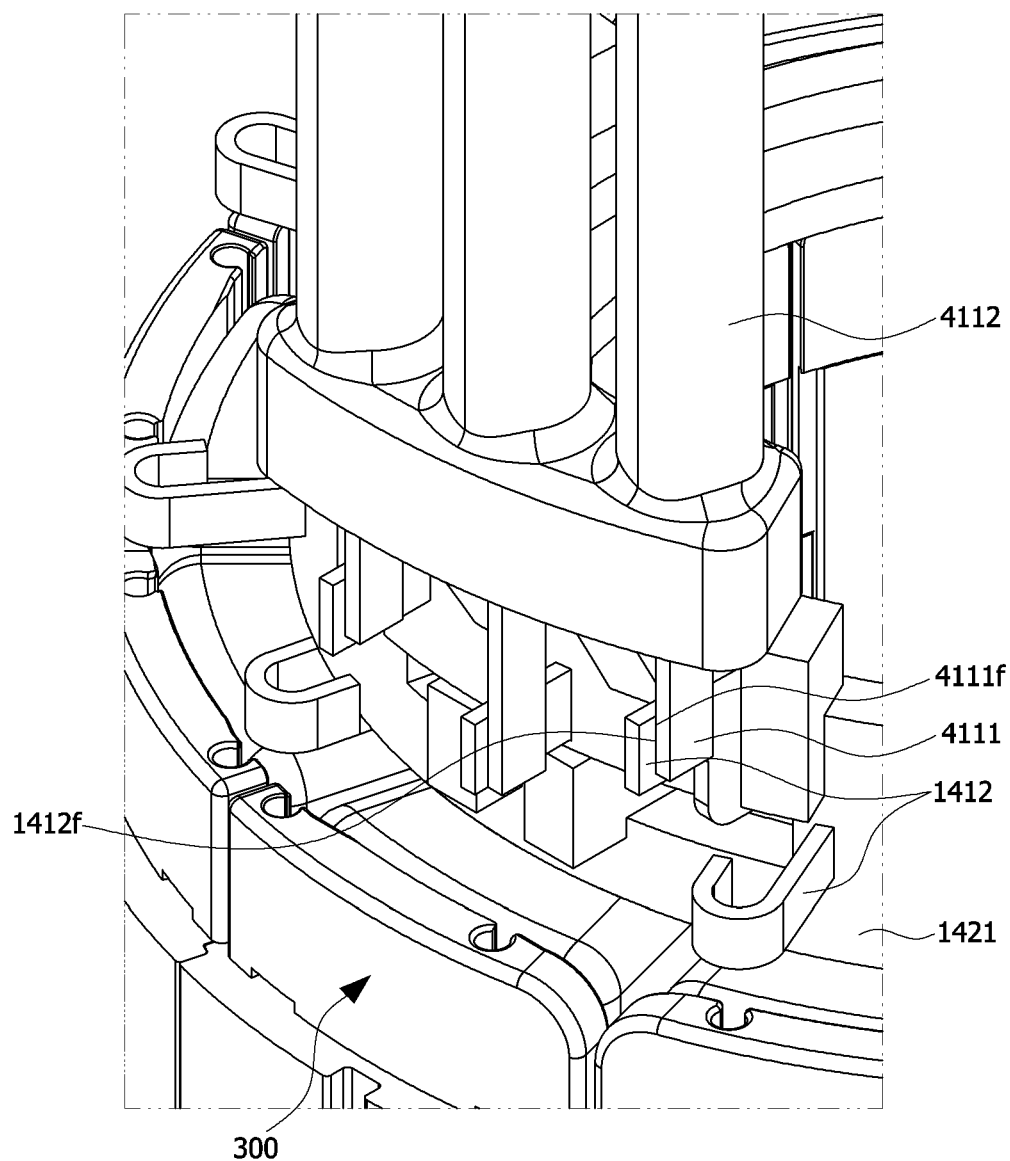

[FIG. 15]
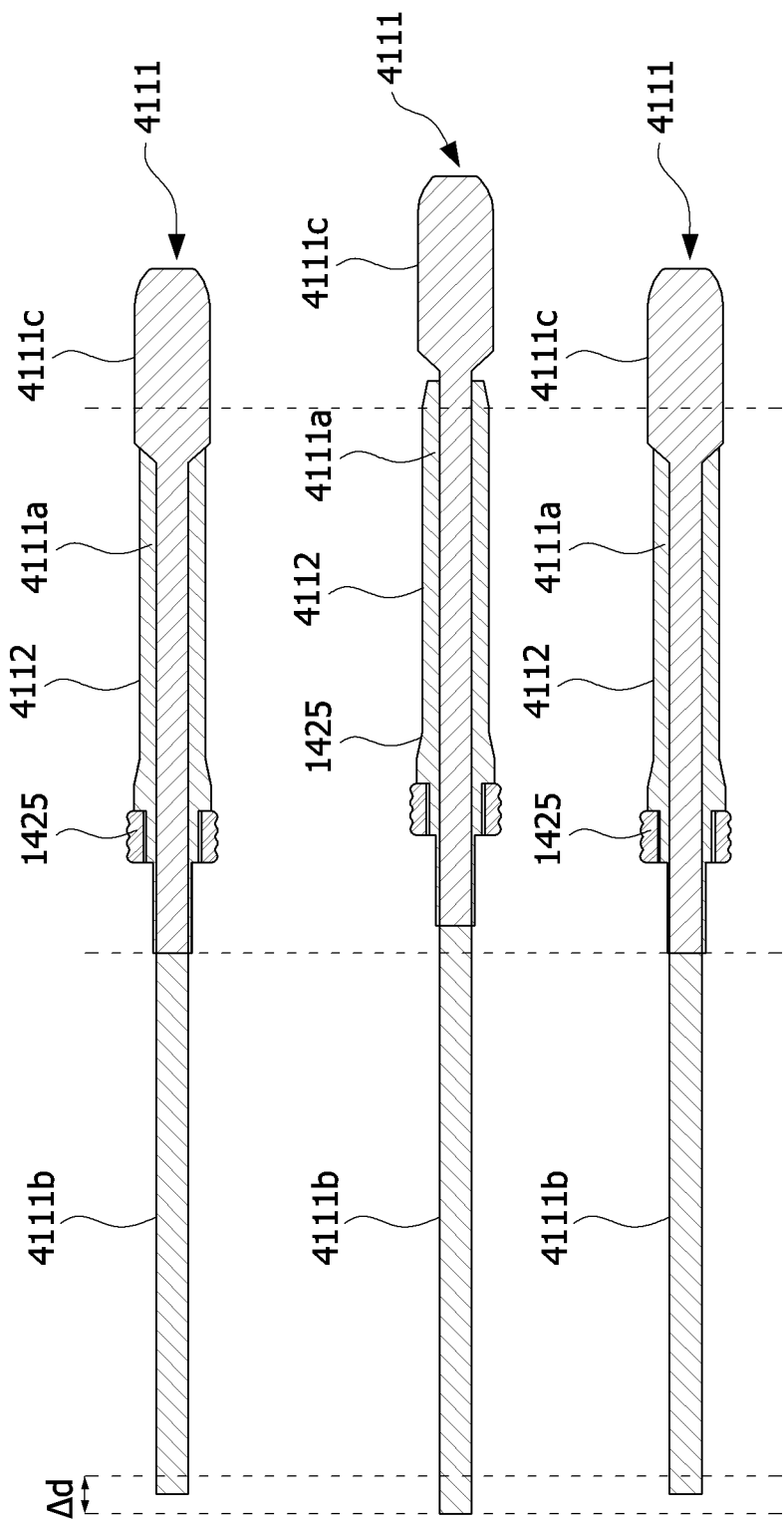

[FIG. 16]
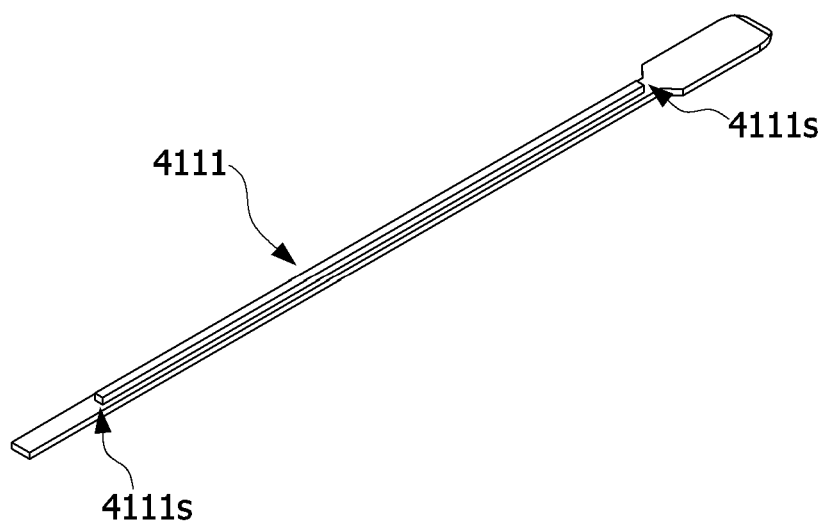

[FIG. 17]
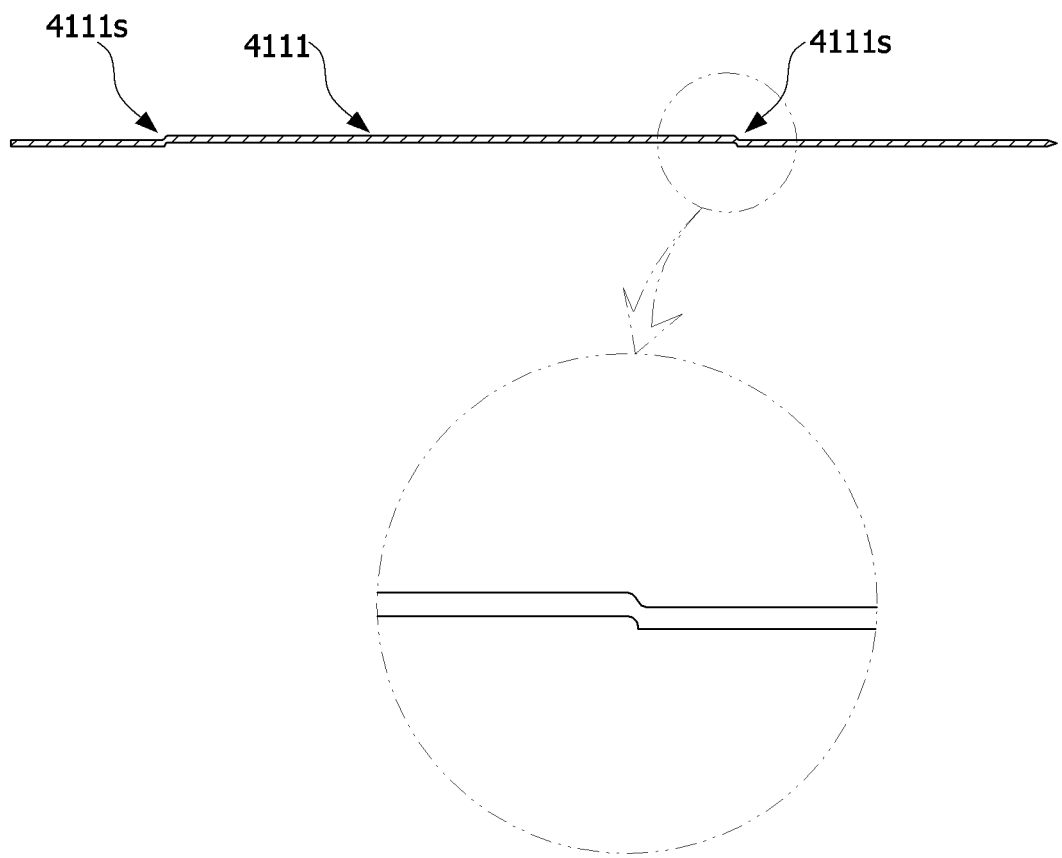
[FIG. 18]
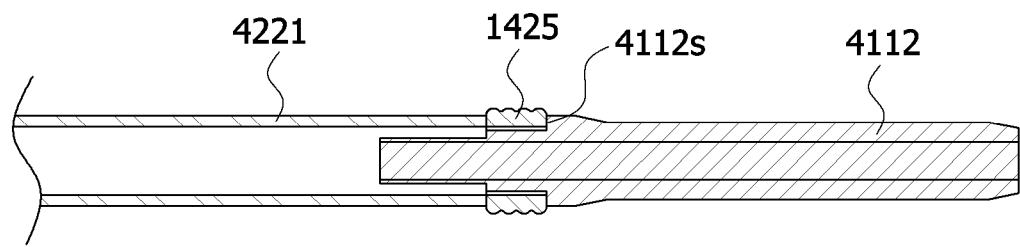

[FIG. 19]
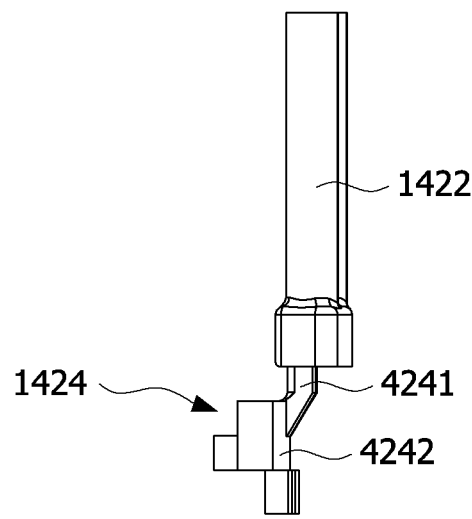
[FIG. 20]
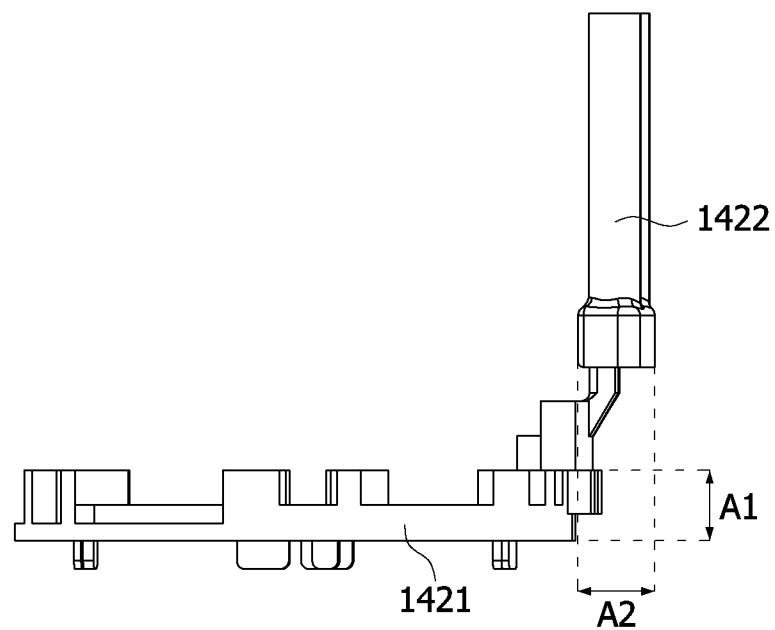

[FIG. 21]
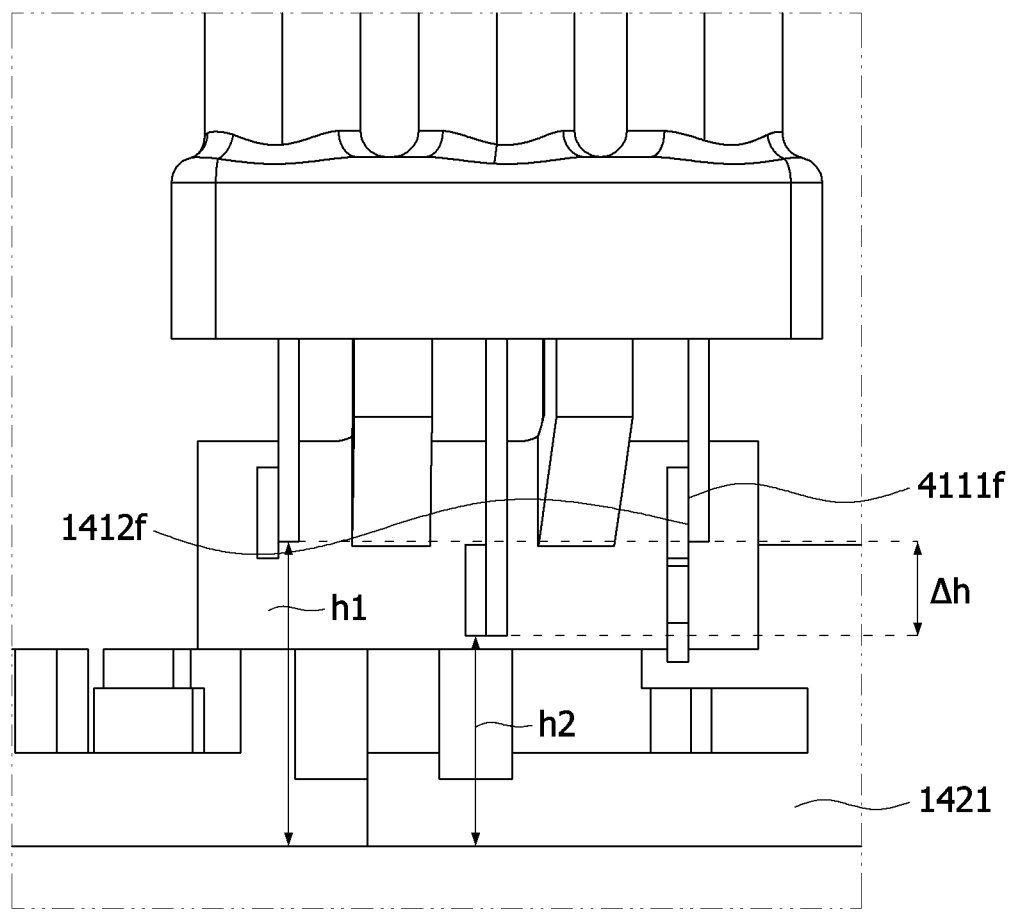

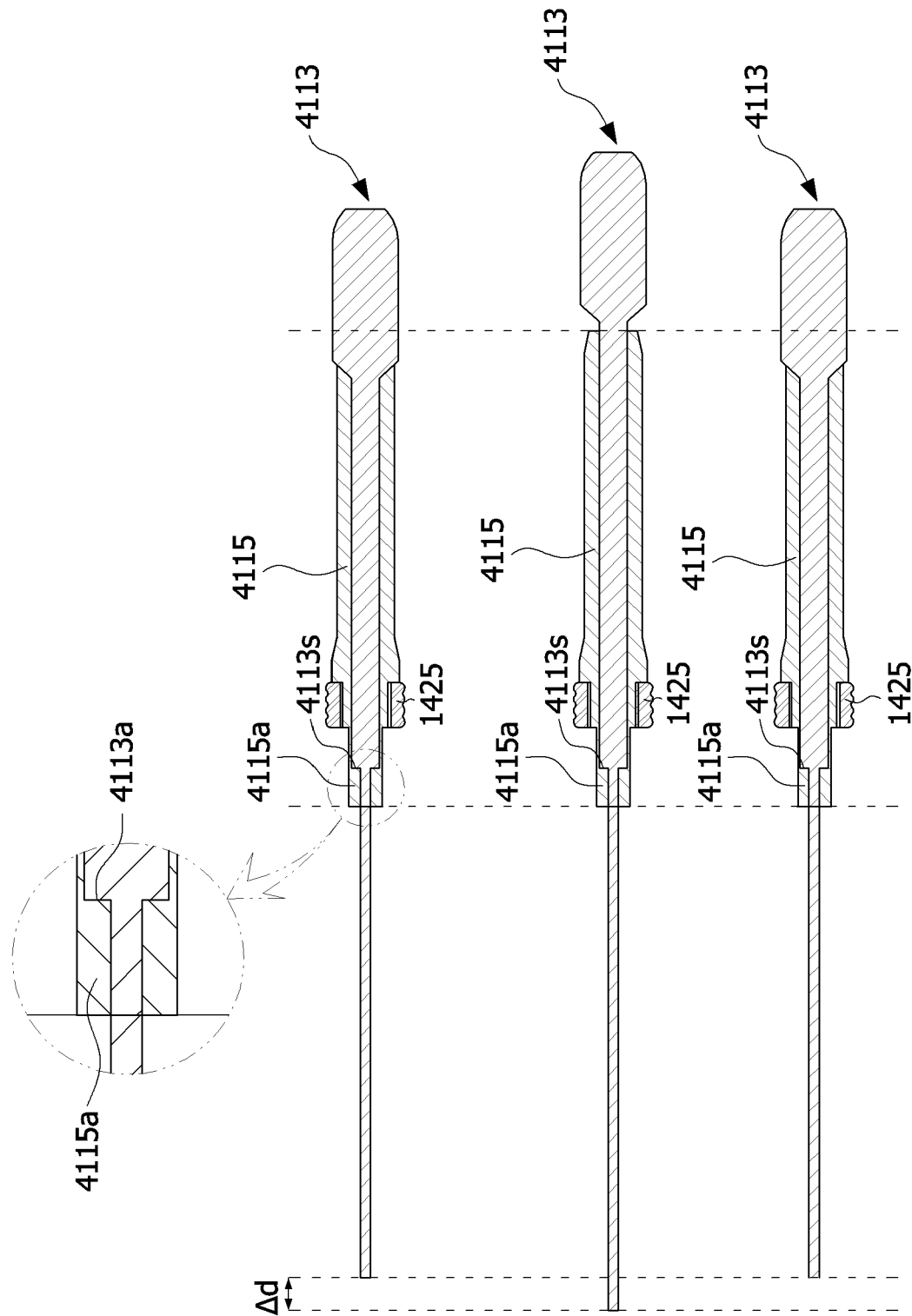
[FIG. 22]

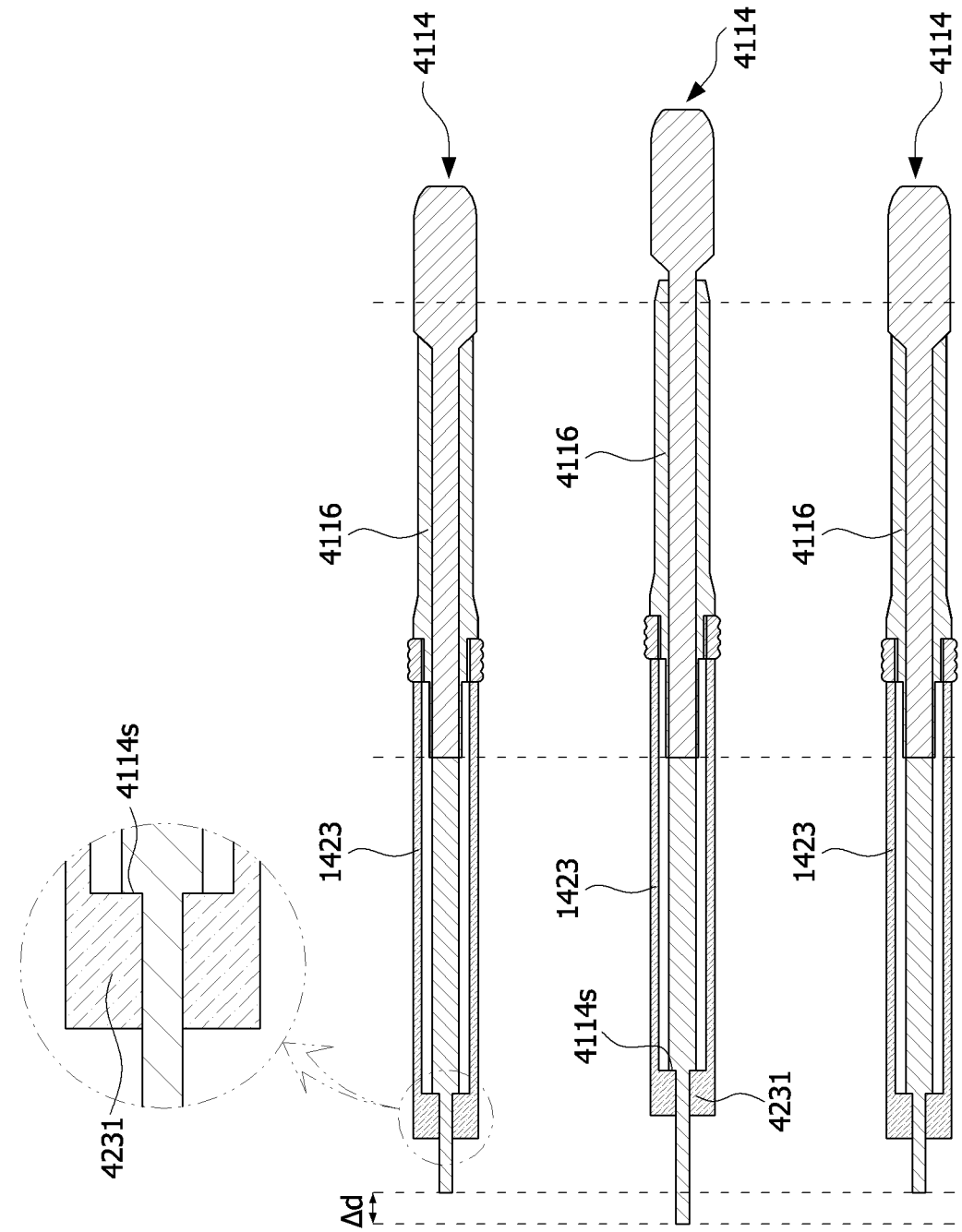

//  MOTOR

CROSS-REFERENCE TO RELATED PATENT APPLICATIONS

This application is a U.S. National Stage Application under 35 U.S.C. § 371 of PCT Application No. PCT/KR2019/013851, filed Oct. 22, 2019, which claims priority to Korean Patent Application Nos. 10-2018-0126087, filed Oct. 22, 2018 and 10-2019-0080213, filed Jul. 3, 2019, whose entire disclosures are hereby incorporated by reference.

TECHNICAL FIELD

The present invention relates to a motor.

BACKGROUND ART

Electronic power steering (EPS) systems secure turning stability and provide a rapid restoring force so that drivers can travel safely. Such an EPS system controls driving of a steering shaft of a vehicle by driving a motor using an electronic control unit (ECU) according to driving conditions detected by a vehicle speed sensor, a torque angel sensor, a torque sensor, and the like.

The motor incudes a stator and a rotor. The stator may include stator cores and coils wound around teeth of the stator core. The stator may include the plurality of stator cores. In addition, the coils may be wound around the stator cores.

The divided coils are connected by a busbar. The busbar is connected to a terminal portion connected to an external power source. The busbar and the terminal portion may be integrally designed. However, when a length of the terminal portion is long, there are problems in that it is difficult to form the terminal portion through an injection molding process, and it is difficult to arrange a position of the terminal portion. In addition, when a terminal of the busbar and a terminal of the terminal portion are integrally formed, there is a problem in that a large number of scraps are generated in a process in which the terminals are formed.

In addition, the terminal portion is extended longer in a shaft direction. Accordingly, a problem occurs in that the terminal portion is bent or position accuracy of the terminal portion is insufficient.

In addition, in a process in which the terminal of the terminal portion and the terminal of the busbar are fused, there are problems in that workability is degraded because a fusing space is insufficiently secured, and fusing quality is degraded due to interference between components.

Technical Problem

The present invention is directed to providing a motor which allows a position arrangement of a terminal portion connected to a busbar to be facilitated, and a number of scraps to be decreased when a terminal is manufactured.

The present invention is also directed to providing a motor of which position accuracy of a terminal portion is to be improved and fusing quality of a terminal is improved.

Objectives to be solved by the present invention are not limited to the above-described objectives, and other objectives which are not described above will be clearly understood by those skilled in the art from the following specification.

Technical Solution

One aspect of the present invention provides a motor including a housing, a stator disposed in the housing, a rotor disposed in the stator, a shaft coupled to the rotor, a busbar disposed above the stator, and a terminal portion connected to the busbar, wherein the busbar includes a busbar body and a plurality of first terminals disposed on the busbar body, the terminal portion includes a terminal body and second terminals disposed on the terminal body, first end portions of the first terminals are in contact with second end portions of the second terminals, the busbar body includes a first coupling part, the terminal body includes a second coupling part, the first coupling part is disposed between the first end portions, and the second coupling part is disposed between the second end portions.

The first coupling part and the second coupling part may be disposed to overlap in a circumferential direction based on the shaft.

The busbar may include a plurality of guides which extend upward from an upper surface of the busbar body and surround one portions of the first terminals, the plurality of guides may be disposed to be spaced apart from each other in the circumferential direction, and the first coupling part may include a hole formed by the plurality of guides disposed to be spaced apart from each other.

The terminal portion may include a protrusion extending downward from a lower surface of the terminal body, and the second coupling part may be the protrusion.

The busbar body may include a third coupling part, the terminal body may include a fourth coupling part, and the third coupling part may be coupled to the fourth coupling part using a coupling member.

Another aspect of the present invention provides a motor including a housing, a stator disposed in the housing, a rotor disposed in the stator, a shaft coupled to the rotor, a busbar disposed above the stator, and a terminal portion connected to the busbar, wherein the busbar includes a busbar body and a plurality of first terminals disposed on the busbar body, the terminal portion includes a terminal body and a plurality of second terminals disposed on the terminal body, first end portions of the first terminals are in contact with second end portions of the second terminals, and the busbar body is fitted to the terminal body in a shaft direction.

The busbar may include first bosses disposed at both sides of the first end portion and protruding upward from an upper surface of the busbar body, the terminal portion may include second bosses disposed at both sides of the second end portion and extending from the terminal body in a circumferential direction, and the first bosses and the second bosses may overlap in a shaft direction.

The first bosses and the second bosses may incudes coupling holes and may further include coupling members disposed in the coupling holes to couple the first bosses and the second bosses.

Still another aspect of the present invention provides a motor including a stator, a rotor disposed in the stator, a shaft coupled to the rotor, a busbar disposed above the stator, and a terminal portion connected to the busbar, wherein the terminal portion includes a terminal body and third terminals disposed on the terminal body, the busbar includes a busbar body and a plurality of fourth terminals disposed on the busbar body, at least one of the plurality of third terminals includes terminal ends and insulating members surrounding one portions of the terminal ends, the terminal ends pass through the terminal body, and the insulating members are coupled to the terminal body.

A height of an end portion of the at least one third terminal may be different from a height of an end portion of another adjacent third terminal.

The plurality of third terminals may include fusing portions fused to the plurality of fourth terminals, and heights of the fusing portions which are adjacent to each other may be different.

A side surface of the terminal end may be a flat surface, and the fusing portion may be formed on a lower side surface of the terminal end.

The plurality of third terminals may include first stepped portions on side surfaces.

The number of the plurality of third terminals may be three, lengths of the third terminals disposed at both sides thereof may be the same in a shaft direction, and a length of the third terminal disposed at a center thereof may be longer than the lengths of the third terminals disposed at the both sides thereof in the shaft direction.

The terminal ends may include first regions in contact with the insulating members, second regions which extend from the first regions and of which end portions are used to the fourth terminals, and lengths of the second regions which are adjacent to each other are different in the shaft direction.

A width of one portion of the first region may be greater than a width of one portion of the second region.

A second stepped portion may be formed in the first region or the second region, and the terminal body or the insulating member may include a support which is in contact with the second stepped portion to support the third terminal.

The busbar body may include a neck connecting the busbar body and the terminal body.

The terminal body may not overlap the busbar body in the shaft direction.

The terminal body may not overlap the busbar body in a radial direction.

A material of the terminal body may be the same as a material of the insulating member.

The busbar body may further include a sealing member disposed between the terminal body and the insulating member.

Advantageous Effects

According to embodiments, advantageous effects in that a position arrangement of a terminal portion is facilitated and the terminal portion can be disposed accurately are provided.

Since a terminal of a busbar and a terminal of the terminal portion are individually molded, an advantageous effect of significantly reducing a number of scraps is provided when the terminal is manufactured.

An advantageous effect of facilitating assembly of the busbar and the terminal portion is provided.

An advantageous effect in that a coupling force of the busbar and the terminal portion is high is provided.

Since a busbar body and an insulating member are individually formed, position accuracy of terminal ends can be improved, and this is advantageous for managing dimensions of the busbar.

There is an advantage in that a number of scraps can be reduced when a pressing process of the busbar body is performed.

Since a fusing structure of the terminal end is improved, a space for a fusing operation between the terminal ends is secured, and thus workability can be improved, and fusing quality of the busbar can be improved.

DESCRIPTION OF DRAWINGS

FIG. 1 is a view illustrating a motor according to an embodiment.

FIG. 2 is a view illustrating a busbar and a terminal portion.

FIG. 3 is a view illustrating a terminal of the busbar.

FIG. 4 is a view illustrating the busbar including a guide.

FIG. 5 is a view illustrating the busbar including a hole as a first coupling part.

FIG. 6 is a view illustrating a guide.

FIG. 7 is a view illustrating the terminal portion.

FIG. 8 is a view illustrating a lower surface of the terminal portion of FIG. 7.

FIG. 9 is a view illustrating a second end portion of a second terminal and a groove and a protrusion of a terminal body.

FIG. 10 is a view illustrating a coupling state of the busbar and the terminal portion.

FIG. 11 is a perspective view illustrating a busbar and a terminal portion of a motor according to another embodiment.

FIG. 12 is an exploded perspective view illustrating the motor illustrated in FIG. 11.

FIG. 13 is a side view illustrating the busbar and the terminal portion illustrated in FIG. 11.

FIG. 14 is a perspective view illustrating a fusing portion of a terminal end and a second terminal.

FIG. 15 is a cross-sectional view illustrating the terminal end and an insulating member.

FIG. 16 is a perspective view illustrating the terminal end.

FIG. 17 is a cross-sectional view illustrating the terminal end.

FIG. 18 is a cross-sectional view illustrating a coupling state of a first tube and the insulating member.

FIG. 19 is a side view illustrating a neck and a terminal body.

FIG. 20 is a side view illustrating a busbar body and the terminal body.

FIG. 21 is a view illustrating a height of an end portion of the terminal end.

FIG. 22 is a cross-sectional view illustrating a second example of the terminal end and the insulating member.

FIG. 23 is a cross-sectional view illustrating a third example of the terminal end and the insulating member.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

FIG. 1 is a view illustrating a motor according to an embodiment. Referring to FIG. 1, the motor according to the embodiment may include a housing 400, a shaft 100, a rotor 200, and a stator 300. The stator 300 is disposed in the housing 400, the rotor 200 is disposed in the stator 300, and the rotor 200 is disposed outside the shaft 100. In this case, the term "inside" refers to a direction toward the shaft 100 of the motor, and the term "outside" refers to a direction from the shaft 100 toward the housing 400, which is opposite to the term "inside."

The shaft 100 may be coupled to the rotor 200. When a current is supplied, an electrical interaction occurs between the rotor 200 and the stator 300, the rotor 200 is rotated, and the shaft 100 is rotated in conjunction with the rotation of the rotor 200. The shaft 100 may be connected to a steering apparatus of a vehicle to transmit power to the steering apparatus.

The rotor 200 is rotated due to the electrical interaction with the stator 300.

The rotor 200 may be disposed inside the stator 300. The rotor 200 may include a rotor core and magnets disposed on the rotor core.

The stator 300 is disposed outside the rotor 200. The stator 300 may include a stator core 310, insulators 320, and coils 330. The insulators 320 are installed on the stator core 310. The coils 330 are wound around the insulators 320. The coils induce an electrical interaction with the magnets of the rotor 200.

The rotor 200 and the stator 300 are accommodated in the housing 400.

A busbar 500 is disposed above the stator 300. The busbar 500 connects the coils to the stator 300.

Terminal portions 600 (see FIG. 2) are connected to the busbar 500. In addition, the terminal portion 600 is connected to an external power source.

FIG. 2 is a view illustrating the busbar and the terminal portion. FIG. 3 is a view illustrating a terminal of the busbar.

Referring to FIG. 2, the busbar 500 may include a busbar body 510 and first terminals 520. The busbar body 510 may be a member having an annular shape. The first terminals 520 are disposed on the busbar body 510. The first terminals 520 may be phase terminals.

The terminal portions 600 may include terminal bodies 610 and second terminals 620 disposed on the terminal bodies 610.

Referring to FIGS. 2 and 3, the plurality of first terminals 520 may be provided and three first terminals 520 may be formed to implement a U-phase, a V-phase, and a W-phase. In this case, the first terminals 520 may include first end portions 521. In this case, the first end portions 521 refer to end portions of the first terminals 520 extending in a radial direction to be in contact with the second terminals 620. In addition, three second terminals 620 may also be formed to apply power with the U-phase, the V-phase, and the W-phase to correspond to the first terminals 520, and the second terminals 620 may include second end portions 621. The second end portions 621 refer to end portions of the second terminals 620 in contact with the first end portions 521.

The busbar 500 and the terminal portion 600 may be assembled by coupling a first coupling part and a second coupling part.

In addition, the busbar 500 and the terminal portion 600 may be coupled by coupling a third coupling part and a fourth coupling part. The first coupling part may be fitted to the second coupling part in a shaft direction. The third coupling part may be coupled to the fourth coupling part using a coupling member 700.

FIG. 4 is a view illustrating the busbar including a guide, and FIG. 5 is a view illustrating the busbar including a hole as the first coupling part.

Referring to FIGS. 4 and 5, the busbar body 510 may include holes 530 as the first coupling part. The holes 530 are disposed between guides 540. The holes 530 correspond to spaces between the guides 540. The holes 530 are disposed in the shaft direction. The guides 540 extend upward from an upper surface of the busbar body 510 and are disposed to surround one portions of the first end portions 521 to correspond to shapes of the first end portions 521 of the first terminals 520. Ends of the first end portions 521 are exposed to be connected to the second end portions 621.

The holes 530 may be disposed between the first end portions 521 in a circumferential direction based on a center C of the busbar 500. For example, three first end portions 521 may be disposed, and one hole 530 may be disposed between two first end portions 521 so that a total of two holes 530 may be disposed between three first end portions 521.

FIG. 6 is a view illustrating the guide.

Referring to FIG. 6, the guides 540 may include first parts 541 and the second parts 542. The first parts 541 may protrude from the upper surface of the busbar body 510. The second parts 542 may be bent from the first parts 541 and extend outward in a radial direction of the busbar 500. The second coupling part of the terminal body 610 is fitted into the hole 530 formed between the second parts 542 to be disposed in the hole 530. The busbar body 510 may include the third coupling part. The busbar body 510 may include first bosses 550 including coupling holes as the third coupling part. The first bosses 550 may be disposed at both sides of the guides 540. The first bosses 550 may protrude from the upper surface of the busbar body 510.

FIG. 7 is a view illustrating the terminal portion, and FIG. 8 is a view illustrating a lower surface of the terminal portion of FIG. 7.

Referring to FIGS. 7 and 8, the terminal portion 600 may include the terminal body 610 and the second terminals 620. The terminal body 610 may be formed to extend in a longitudinal direction. The second terminals 620 are disposed on the terminal body 610. The second terminals 620 may be formed to extend in the longitudinal direction. Ends of the second end portions 621 of the second terminals 620 are exposed at the outside of the terminal body 610. This is to be connected to the first end portions 521.

The terminal body 610 includes protrusions 630 which are the fourth coupling part. The protrusions 630 are disposed in a groove 640. The groove 640 is disposed in a lower end portion of the terminal body 610. The groove 640 is fitted to the guide 540 of the busbar body 510. The plurality of protrusions 630 may be provided. The number of the protrusions 630 may correspond to the number of holes 530. The protrusions 630 may be fitted to the holes 530 of the busbar body 510.

FIG. 9 is a view illustrating the second end portion of the second terminal and the groove and the protrusion of the terminal body.

Referring to FIGS. 5 and 9, the protrusions 630 may be disposed between the second end portions 621 in the circumferential direction. In addition, in a state in which the busbar body 510 and the terminal body 610 are coupled, the protrusions 630 may be disposed between the first end portions 521. In addition, in the state in which the busbar body 510 and the terminal body 610 are coupled, the grooves 640 may be disposed between the second end portions 621 in the circumferential direction.

When the protrusions 630 are fitted to the holes 530 of the busbar body 510, the protrusions 630 and the groove 640 overlap in the circumferential direction. In addition, when the protrusions 630 are fitted to the holes 530 of the busbar body 510, the second end portions 621 are in contact with the first end portions 521. The terminal body 610 may include the fourth coupling part. The terminal body 610 may include second bosses 650 including coupling holes as the fourth coupling part. The second bosses 650 may be disposed at both sides of the groove 640.

FIG. 10 is a view illustrating a coupling state of the busbar and the terminal portion.

Referring to FIGS. 5, 9, and 10, the busbar body 510 is fitted to the terminal body 610 in the shaft direction. The protrusions 630 enter the holes 530 between the guides 540. Although the busbar body 510 and the terminal body 610 are individual components, since the busbar body 510 is fitted to the terminal body 610, assembly thereof is easy. In addition, since the protrusions 630 are fitted thereto along sidewalls of the guides 540 including the first end portions 521, there is an advantage in that a position arrangement of the second terminals 620 is facilitated. Particularly, since the holes 530 are disposed between the first end portions 521 and the protrusions 630 are disposed between the second end portions 621, there is an advantage in that the plurality of first end portions 521 are accurately in contact with the plurality of second end portions 621.

In the state in which the protrusion 630 is inserted into the hole 530, the coupling hole of the first boss 550 and the coupling hole of the second boss 650 are aligned. The first boss 550 and the second boss 650 are coupled using the coupling member 700 such as a bolt. The first boss 550 is coupled to the second boss 650 to increase a coupling force of the busbar 500 and the terminal portion 600. When it is considered that the terminal portion 600 is disposed to extend in the shaft direction, the coupling of the first boss 550 and the second boss 650 improves structural stability of the terminal portion 600 and is advantageous for arranging positions thereof.

FIG. 11 is a perspective view illustrating a busbar and a terminal portion of a motor according to another embodiment, FIG. 12 is an exploded perspective view illustrating the motor illustrated in FIG. 11, FIG. 13 is a side view illustrating the busbar and the terminal portion illustrated in FIG. 11, and FIG. 14 is a perspective view illustrating a fusing portion of a terminal end and a second terminal.

Referring to FIGS. 11 and 12, a plurality of third terminals 1411 are provided. The plurality of third terminals 1411 may be disposed in a shaft direction. For example, three third terminals 1411 may be disposed. In this case, lengths of the three third terminals 1411 may be the same or different. The lengths of the third terminals 1411 disposed on both sides thereof may be the same in the shaft direction. However, the length of the third terminal 1411 disposed at a center thereof may be longer than the lengths of the third terminals 1411 disposed at both sides thereof in the shaft direction. In this case, the length of the third terminal 1411 may be 100 mm to 130 mm.

Referring to FIGS. 12 to 14, the third terminals 1411 may include terminal ends 4111 and insulating members 4112.

The terminal ends 4111 may be disposed in the shaft direction. In this case, the terminal ends 4111 may be connected to a power source with a U-phase, a V-phase, and a W-phase. In addition, the other sides of the terminal ends 4111 may be connected to fourth terminals 1412. In addition, the terminal end 4111 may be formed in a rod shape of which a cross section is quadrilateral shape. An outer surface of the terminal end 4111 may include a plurality of flat surfaces. In this case, fusing portions 4111f fused to the fourth terminals 1412 may be formed on a lower side surface of the terminal ends 4111.

FIG. 15 is a cross-sectional view illustrating the terminal end and an insulating member, FIG. 16 is a perspective view illustrating the terminal end, and FIG. 17 is a cross-sectional view illustrating the terminal end.

Referring to FIG. 15, the terminal ends 4111 may include first regions 4111a, second regions 4111b, and third regions 4111c.

The first regions 4111a are in contact with the insulating members 4112. In this case, the first regions 4111a and the insulating members 4112 may be coupled in an insert-injection manner.

The second regions 4111b extend from the first regions 4111a in a direction toward one side. In this case, widths of the first regions 4111a may be greater than widths of the second regions 4111b. In addition, the second regions 4111b pass through a terminal body 1422. In this case, end portions of the second regions 4111b may be exposed from a second body 422. In addition, the fusing portions 4111f may be formed on the end portions of the second regions 4111b. In this case, a length of at least one second region 4111b may be different from a length of another adjacent second region 4111b. That is, heights of end portions of the third terminals 1411 may be different from each other to correspond to a difference Δd in length between at least one second region 4111b and another adjacent second region 4111b.

The regions 4111c extend from the first regions 4111a in a direction toward the other side. The third regions 4111c are connected to a power source with the U-phase, the V-phase, and the W-phase. In this case, widths of the third regions 4111c may be greater than widths of the first regions 4111a.

Referring to FIGS. 16 and 17, each of the terminal ends 4111 may include at least one first stepped portion 4111s. In this case, the terminal end 4111 may include the stepped portion 4111s on a side surface thereof. In this case, a protruding region is formed at a central portion of the terminal end 4111 so that the stepped portion 4111s may be formed. In the terminal end 4111, a stress is concentrated at the stepped portion 4111s, and flatness can be improved.

Referring to FIG. 15, the insulating members 4112 surround one portions of the terminal ends 4111. In this case, the insulating members 4112 may be in contact with the first regions 4111a. The insulating members 4112 may be integrally formed with the terminal ends 4111 in an insert-injection manner. In this case, the plurality of insulating members 4112 may be formed. For example, three insulating members 4112 may be formed to correspond to the number of terminal ends. In addition, the insulating members 4112 may be coupled to the terminal body 1422. In this case, the insulating members 4112 may be disposed on the terminal body 1422 in the shaft direction.

The fourth terminals 1412 are disposed under the third terminals 1411. In this case, the fourth terminals 1412 may be connected to coils 330. The plurality of fourth terminals 1412 may be provided. For example, three fourth terminals 1412 may be formed. Three fourth terminals 1412 may be disposed in an annular shape. In this case, the fourth terminals 1412 may be in contact with end portions of the terminal ends 4111. Second fusing portions 412f fused to the terminal ends 4111 may be formed at one sides of the plurality of fourth terminals 1412.

FIG. 18 is a cross-sectional view illustrating a coupling state of a first tube and the insulating member, FIG. 19 is a side view illustrating a neck and the terminal body, and FIG. 20 is a side view illustrating a busbar body and the terminal body.

Referring to FIG. 13, the motor may include a busbar body 1421, the terminal body 1422, a neck 1424, and sealing members 1425.

The busbar body 1421 is disposed on a stator 300. The busbar body 1421 is formed in an annular shape. The plurality of fourth terminals 1412 are disposed in the busbar body 1421. The busbar body 1421 is connected to the terminal body 1422.

The terminal body 1422 is disposed on the busbar body 1421 in the shaft direction. The terminal body 1422 may include a plurality of first tubes. The plurality of first tubes 4221 may include hollow portions, and terminal ends 4111 may pass through the hollow portions. In this case, the end portions of the terminal ends 4111 may be disposed under lower ends of the first tubes 4221 so that the end portions of the terminal ends 4111 may be exposed. In addition, the insulating members 4112 are coupled to upper ends of the first tubes 4221.

Referring to FIGS. 12 and 18, end portions of the insulating members 4112 may be inserted into end portions of the first tubes 4221. In this case, a diameter of the insulating member 4112 may decrease in a direction toward the end portion thereof. End steps 4112s may be formed on the insulating members 4112 to be spaced apart from the end portions of the insulating members 4112 by a predetermined length. In this case, the insulating members 4112 may be restricted from being inserted into the first tubes 4221 due to the end steps 4112s.

The insulating members 4112 and the first tubes 4221 are separable from each other. That is, the insulating members 4112 and the first tubes 4221 are provided as individual components. As described above, since the first tubes 4221 and the insulating members 4112 disposed to correspond to the lengths of the terminal ends 4111 in the shaft direction are formed in the separable structure, there are advantages in that position accuracy of the terminal ends 4111 in the busbar body 1421 can be improved, and dimension management thereof is facilitated.

The neck 1424 is disposed on the busbar body 1421. In this case, the neck 1424 connects the busbar body 1421 and the terminal body 1422. The busbar body 1421, the terminal body 1422, and the neck 1424 may be formed of the same material. The busbar body 1421, the terminal body 1422, and the neck 1424 may be integrally formed.

The sealing members 1425 are disposed between the insulating members 4112 and the terminal body 1422. One end portions of the sealing members 1425 may be in contact with upper end portions of the first tubes 4221. In addition, the other end portions of the sealing members 1425 may be in contact with the end steps 4112s of the insulating members 4112. In addition, the sealing members 1425 may be disposed to surround lower end portions of the insulating members 4112.

Referring to FIGS. 19 and 20, in the neck 1424, an upper end may be disposed outside a lower end in a radial direction. In addition, the neck 1424 may include a first member 4241 and a second member 4242. The second member 4242 may be connected to an upper surface of the busbar body 1421. In addition, the first member 4241 is connected to an upper portion of the second member 4242 and extends in an outer diagonal direction. Accordingly, the busbar body 1421 and the terminal body 1422 may be connected through the neck 1424 to not overlap in the shaft and radial directions.

Referring to FIG. 20, the busbar body 1421 and the terminal body 1422 do not overlap in the radial and shaft directions. In this case, a region A1 of the busbar body 1421 in the radial direction is disposed under the terminal body 1422. In addition, the region A1 of the terminal body 1422 in the shaft direction is disposed outside the busbar body 1421. As described above, since the busbar body 1421 and the terminal body 1422 are disposed to not overlap as much as possible, a fusing space of the end portion of the third terminal 1411 positioned under the busbar body 1421 may be secured sufficiently, and utilization of spaces between the components may be improved.

FIG. 21 is a view illustrating a height of the end portion of the terminal end.

Referring to FIG. 21, when it is assumed that a height of the end portion of the terminal end 4111 is a height from a lower surface of the busbar body 1421 to a lower surface of the terminal end 4111, a height h1 of the end portion of at least one terminal end 4111 is different from a height h2 of the end portion of another adjacent terminal end 4111. In this case, a difference Δh in height between the end portions of the terminal ends 4111 adjacent to each other corresponds to the difference Δd in length between the second regions 4111b adjacent to each other described with reference to FIG. 5. As described above, the heights of the fusing portions 4111f may be different by as much as the difference Δh in height between the terminal ends 4111.

As described above, since the difference Δh in height between the fusing portions 4111f is generated, a space for a fusing operation of the terminal end 4111 and the fourth terminal 1412 is secured, and thus the fusing workability can be improved, and fusing quality of the busbar 1400 can be improved.

Hereinafter, another example of a connection structure of a terminal end and an insulating member of the present invention will be described with reference to FIGS. 22 and 23.

FIG. 22 is a cross-sectional view illustrating a second example of the terminal end and the insulating member, and FIG. 23 is a cross-sectional view illustrating a third example of the terminal end and the insulating member.

Terminal ends 4113 or 4114 and insulating members 4115 or 4116 may be formed in a separate structure. In addition, the terminal ends 4113 or 4114 may be seated on the insulating members 4115 or second bodies 423.

Referring to FIG. 22, in the terminal ends 4113, second stepped portions 4113s may be formed in first regions. In addition, supports 4115a which are in contact with the second stepped portions 4113s to support terminal ends 4113 may be formed in insulating members 4115. In this case, the support 4115a may have a protruding shape protruding in a direction from an inner circumferential surface of the insulating member 4115 to a center of the insulating member 4115. The terminal ends 4113 may be inserted into the insulating members 4115. In this case, the terminal ends 4113 may be inserted thereinto in a direction from a side opposite to a side of the support 4115a toward the side of the support 4115a. In this case, a length from an end portion of at least one terminal end 4113 to the second stepped portion 4113s may be different from a length from one end portion of another adjacent terminal end 4113 to the second stepped portion 4113s. In this case, a difference Δd in length may correspond to the difference Δh in height between the one end portions of the terminal ends 4111 described with reference to FIG. 21.

Meanwhile, referring to FIG. 23, in the terminal ends 4114, second stepped portions 4114s may be formed in second regions. In addition, supports 4231 in contact with the second stepped portions 4114s to support the terminal ends 4114 may be formed in the second bodies 423. In this case, the terminal ends 4113 and the coupled second bodies 423 may be inserted into insulating members 4116. In this case, the terminal end 4114 may be inserted thereinto in a direction from a side opposite to a side of the support 4231 to the side of the support 4231.

As described above, the motor according to one exemplary embodiment of the present invention has been specifically described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not to limit the technological scope. The technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
a housing;
a stator disposed in the housing;
a rotor disposed in the stator;
a shaft coupled to the rotor;
a busbar disposed above the stator; and
a terminal portion connected to the busbar,
wherein the busbar includes a busbar body and a plurality of first terminals disposed on the busbar body,
the terminal portion includes a terminal body and second terminals disposed on the terminal body,
first end portions of the first terminals are in contact with second end portions of the second terminals,
the busbar body includes a first coupling part,
the terminal body includes a second coupling part,
the first coupling part is disposed between the first end portions, and
the second coupling part is disposed between the second end portions,
wherein the busbar includes a plurality of guides which extend upward from an upper surface of the busbar body and surround one portion of the first terminals;
the plurality of guides are disposed to be spaced apart from each other in a circumferential direction; and
the first coupling part includes a hole formed by the plurality of guides disposed to be spaced apart from each other.

2. The motor of claim 1, wherein the first coupling part and the second coupling part are disposed to overlap in the circumferential direction based on the shaft.

3. The motor of claim 1, wherein:
the terminal portion includes a protrusion extending downward from a lower surface of the terminal body; and
the second coupling part includes the protrusion.

4. The motor of claim 1, wherein:
the busbar body is fitted to the terminal body in a shaft direction.

* * * * *